United States Patent
Teichmuller et al.

[15] 3,671,555

[45] June 20, 1972

[54] TRIALKYLSYLILOXY-STEROID COMPOUNDS AND PROCESS FOR MAKING SAME

[72] Inventors: Gerhard Teichmuller; Kurt Barnikol-Oettler; Werner Hartmann, all of Jena, Germany

[73] Assignee: VEB Jenapharm, Jena, Germany

[22] Filed: March 5, 1969

[21] Appl. No.: 804,662

[52] U.S. Cl....................260/397.4, 260/397.47, 260/397.5, 260/448.2, 260/999
[51] Int. Cl.................................C07c 169/08, C07c 169/20
[58] Field of Search...................../Machine Searched Steroids

[56] References Cited

UNITED STATES PATENTS 3,311,644  3/1967  Brown et al.........................260/397.4

OTHER PUBLICATIONS

Chang et al., Jour. of Medicinal Chemistry, pp. 433– 435 (May, 1966).
Klebe et al., J.A.C.S. 88, pp. 3390– 3395 (July, 1966).
Vanden Heuvel et al., Biochimica et Biophysica Acta, pp. 691– 694 (December, 1967).

Primary Examiner—Henry A. French
Attorney—Michael S. Striker

[57] ABSTRACT

Trialkylsilyloxyether-substituted steroid compounds. The compounds are made from steroids which include phenolic hydroxyl groups by dissolving the steroid compound in a dipolar aprotic solvent and reacting it with hexamethyldisilazane, or a mixture of this compound with trimethylchlorosilane, followed by recovery of the trimethylsilyloxyether.

21 Claims, No Drawings

TRIALKYLSYLILOXY-STEROID COMPOUNDS AND PROCESS FOR MAKING SAME

BACKGROUND OF THE INVENTION

The invention relates to a process of making trialkylsilyloxy-steroid compounds.

Silylethers of steroids such as cholesterol, stigmasterol, 5α-androstane-17β-ol, 4,4-dimethyl-Δ⁵-androstene-3β-ol, etc. have already been made by reacting a steroid alcohol with hexamethyldisilazane and trimethyl-chlorosilane in an anhydrous solvent, such as tetrahydrofuran, cyclohexane/pyridine or benzene, and also by using melts with N-trimethylsilylacetamide.

It is also known to effect this kind of reaction in pyridine with steroids that are substituted in the 3-position by oxygen or hydrogen and in addition have a Δ⁴ or Δ¹,⁴ double bond, and furthermore are substituted in the 17 Δ-position by hydrogen or a saturated lower alkyl group. The thus produced steroid silylethers have anabolic, and androgenic properties.

In the literature, statements can be found that in this kind of reaction all types of hydroxyl groups are converted to silyloxy groups. However, it has been found that this is not correct. For instance, using tetrahydrofuran as solvent, the secondary hydroxyl groups of the starting product are completely converted in a reaction time of about 30 hours, but the tertiary hydroxyl groups are not converted at all to the silylether groups under these conditions. The use of cyclohexane/pyridine or benzene with reflux heating, on the other hand, requires a reaction time of up to 6 hours for the secondary hydroxyl groups.

For the reactions without solvents, using hexamethyldisilazane and trimethylchlorosilane and boiling temperatures, a reaction time of 1 to 4 hours is necessary for conversion of the primary and secondary alcohols, and of 12 to 20 hours for conversion of the tertiary alcohols. The yield with the mentioned methods in general is between about 50 and 70 percent.

Melting the steroid-alcohols with N-trimethylsilyl-acetamide leads to conversion of all types of hydroxyl groups. However, the conditions of a melting process carried out during a shorter time require a temperature of 125° C and are therefore not suited for temperature-sensitive materials and are difficult to carry out technically. A further shortcoming of this method is that the acetamide formed in the reaction can not be eliminated completely when the steroid silylether is isolated, or at least requires special purification steps which result in a loss of yield. The elimination of the acetamide is unfortunately indispensable, since this compound has unfavorable effects on subsequent chemical reactions where the silylether is used as an intermediate and is an unacceptable contamination wherever the product is used for pharmaceutical purposes.

Employing pyridine with hexamethyldisilazane and trimethylchlorosilane results in the desired conversion. However, what is obtained in the further treatment is primarily an oily product which solidifies only after a long period of time and then requires separation or extraction with hexane to obtain the isolated product. This method likewise requires a tedious purification in order to completely remove the pyridine.

While it is true that complete conversions can be obtained with these two processes, it is necessary to employ further purification in view of the kind of starting product and solvent, and thus purification in the case of unstable products as some silylethers are, depending on the particular substituents involved, and in particular in the case of silylethers having phenolic hydroxyl groups, normally leads to a substantial reduction of the yield.

SUMMARY OF THE INVENTION

It is an object of the invention, therefore, to provide a process of making steroid silylethers which proceeds under industrially acceptable conditions and results in a quantitative conversion and permits isolation of the reaction products in substantially pure form without reduction of yield and without further purification steps.

It is another object of the invention to provide for new types of steroid silylethers.

These objects are met by a process of making trialkylsilyloxy-ether-substituted steroid compositions by dissolving a steroid compound which includes at least one phenolic hydroxyl group in a dipolar aprotic solvent and then reacting the product of the reaction with a hexaalkyldisilazane or a mixture of this compound with a trialkylchlorosilane followed by recovery of the trialkylsilyloxyether. The invention also embraces certain new trialkylsilyloxyether-substituted steroid compounds of the formula

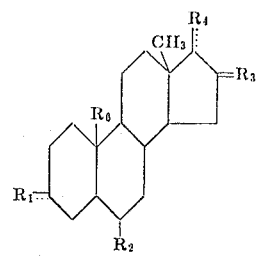

wherein $R_1$ is $=O$, $OR_5$, $OR_7$, or 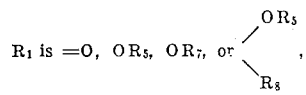

$R_2$ is hydrogen, $OR_5$ or halogen, $R_3$ is $H_2$, $OR_5$, $=O$, $OR_7$, or 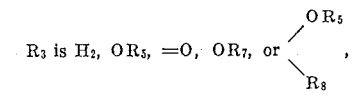

$R_4$ is $=O$, $OR_5$, $OR_7$, 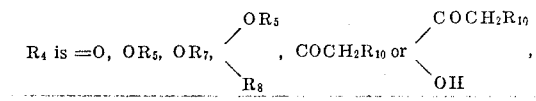

$R_5$ is a trialkylsilyl group $R_6$ is hydrogen or lower alkyl, if the adjoining bonds are saturated, $R_7$ is acyl having up to five carbon atoms, benzoyl, or lower alkyl having up to five carbon atoms, or cyclopentyl, $R_8$ is $-CH=CHX$ or $-C\equiv C-X$, X being hydrogen or halogen, or $R_8$ is lower alkyl if $R_1$ is $OR_5$, $R_{10}$ is $OR_5$ or hydrogen, and the total number of trialkyl silyl groups is from 1 to 3.

DESCRIPTION OF THE PREFERRED EMBODIMENTS

The trialkylsilyloxy-steroids of the invention have excellent endocrinological properties, are useful for many different applications, and in particular can be employed as the effective anabolic, estrogenic or progestational agent in pharmaceutical compositions.

The racemic 19-nor-testosterone-silylether, for instance, has a very desirable quotient, that is, a comparatively low androgenic effect when compared with testosterone-phenylpropionate, the most common compound in this area. This property was established after subcutaneous application by means of the Hershberger Test.

The silylether of estradiol, estrone and ethinylestradiol and derivatives of these compounds for instance are very effective for the purpose of a long-time ovulation blocking. Tested, for instance, by the method of Dr. Chemnitius, it was found that the estrone-silylether and the ethinylestradiol-silylether, after oral administration to rats, have an ovulation blocking of much longer duration with rats compared with ethinylestradiol-3-cyclopentylether.

The estrone-silylether also has a much higher dissociation between estrogenic activity and the ovulation blocking (depot ovulation blocking) as against the same comparison substance. The estrogenic activity was determined in these tests by the usual international benzoate units.

The referred to silylethers also have a generally lower toxicity than the ethinylestradiol-3-cyclopentylether or the steroids used as starting products for making the compounds of the invention.

The excellent endocrinological action of the steroid silylethers of the invention at peroral application was unexpected and surprising in view of the low acid resistance of this general class of compounds.

The compounds of the invention may be applied orally, subcutaneously or by intravenous injection.

The compounds of the invention are also important as intermediates for the synthesis of other steroid pharmaceuticals and are particularly suited for the making of highly pure synthetic products because of their excellent crystallization properties.

Trialkylsilylethers have been used as protective groups for hydroxyl radicals in chemical reactions. They also have been used with success in gas-chromatography research regarding natural products and metabolic products.

As has been pointed out, the process of the invention proceeds from steroid compounds which include at least one phenolic hydroxyl group. Preferably, the starting product has the formula

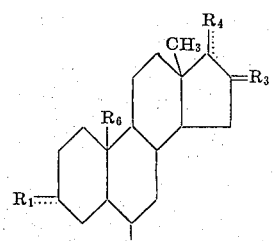

wherein $R_1$ is =O, OH, O$R_7$, or $\diagup^{OH}_{\diagdown R_8}$, $R_2$ is hydrogen, OH or halogen, $R_3$ is $H_2$, OH, =O, O$R_7$ or $\diagup^{OH}_{\diagdown R_8}$, $R_4$ is =O, OH, O$R_7$, $\diagup^{OH}_{\diagdown R_8}$, COC$H_2R_{10}$ or $\diagup^{COCH_2R_{10}}_{\diagdown OH}$, $R_6$ is hydrogen, or lower alkyl, if the adjoining bonds are saturated, $R_7$ is acyl having up to five carbon atoms, benzoyl, or lower alkyl having up to five carbon atoms, or cyclopentyl, $R_8$ is —CH=CHX or —C≡CX, X being hydrogen or halogen, and $R_{10}$ is OH or hydrogen, provided that in the latter case at least one of the radicals $R_1$, $R_2$, $R_3$ and $R_4$ must include at least one OH group.

In this formula, the rings A, B, C and D may be cis- or trans-connected. The compounds may also be unsaturated in one of the following positions: $\Delta^1$, $\Delta^3$, $\Delta^4$, $\Delta^5$, $\Delta^{5(10)}$, $\Delta^8$, $\Delta^{8(14)}$, $\Delta^{9(11)}$, $\Delta^{14}$. The compounds may be homo- or seco- steroids.

The silicone compounds employed for reaction with the steroids preferably are hexamethyldisilazane or a mixture of this compound with a trialkylchlorosilane, preferably trimethylchlorosilane.

The silicone compound is reacted with the steroid after the latter has been dissolved in a dipolar aprotic solvent. It will be understood that this definition includes solvents which may contain hydrogen compounds but which have a dielectric constant >15 and therefore cannot donate labile hydrogen atoms to form strong hydrogen bonds; see "*Advances in Organic Chemistry, Methods and Results*," Volume V, pages 2–3. Common dipolar aprotic solvents are dimethylformamide, dimethylacetamide, N-methyl-2-pyrrolidone, dimethylsulfoxide, tetrahydrothiophendioxide (sulfolane), dimethylsulfone, acetone, nitromethane, acetonitrile, nitrobenzene, sulfur dioxide, and propylene carbonate.

The preferred solvents in the present case are: dimethylformamide, dimethylsulfoxide and dimethylacetamide.

The temperature of the dissolving step may be 30°–40° C and should in any case be sufficient to obtain complete dissolving. The precipitation is preferably effected at room temperature.

Preferably, the sequence of steps is as follows:

The steroid is dissolved in the solvent, preferably upon heating over a water bath until it is completely dissolved. The solution is then cooled and reacted with the silicone compound. Preferably, hexamethyldisilazane is employed in amounts between 1 and 3 mols and the trimethyl-chlorosilane is used in amounts of 0.6 to 1.8 mols per hydroxyl group of the steroid molecule.

At the completion of the reaction, the desired silyloxy-steroid can either be quantitatively isolated from the reaction mixture after crystallization has taken place or water may be added to quantitatively recover the silyloxy-steroid in crystalline form.

There are thus obtained, trialkylsilyloxysteroids in which the primary, secondary and tertiary hydroxyl groups — whichever may be present in the starting compound — are converted to silyloxy groups. It is thus possible to obtain a trialkylsilyloxy-steroid wherein a conversion of the phenolic primary and secondary hydroxyl groups to silyloxy groups is accomplished in spite of the fact that tertiary hydroxyl groups may have been present in the starting compound.

It has also been found that with this type of process it is possible to produce trialkylsilyloxy-steroids wherein only part of the functional hydroxyl groups of the starting compounds are converted to trialkylsilyloxy groups. This can be done by starting from a product containing a plurality of functional hydroxyl groups and, after completion of the reaction with the silicone compound and recovery of the completely converted silyloxy-steroid, reacting the product with an alcohol, for instance methanol or benzyl alcohol, and then precipitating the trialkylsilyloxy-steroid which has the desired degree of conversion, that is, the desired number of silyloxy groups, by adding water to the reaction mixture.

The compounds of the present invention include novel trialkylsilyloxy-steroids which have the following formula:

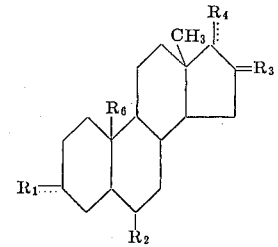

wherein $R_1$ is =O, O$R_5$, O$R_7$, or $\diagup^{OR_5}_{\diagdown R_8}$, $R_2$ is hydrogen, O$R_5$ or halogen, $R_3$ is $H_2$, O$R_5$, =O, O$R_7$, or $\diagup^{OR_5}_{\diagdown R_8}$, $R_4$ is =O, O$R_5$, O$R_7$, $\diagup^{OR_5}_{\diagdown R_8}$, COC$H_2R_{10}$ or $\diagup^{COCH_2R_{10}}_{\diagdown OH}$, $R_5$ is a trialkylsilyl group, $R_6$ is hydrogen or lower alkyl, if the adjoining bonds are saturated, $R_7$ is acyl having up to five carbon atoms, benzoyl, or lower alkyl having up to five carbon atoms, or cyclopentyl, $R_8$ is —CH = CHX or —C ≡ CX, X being hydrogen or halogen, or $R_8$ is lower alkyl if $R_1$ is $OR_5$, $R_{10}$ is $OR_5$ or hydrogen, and the total number of trialkyl silyl groups is from 1 to 3.

Specific examples of the novel compounds of the invention are the following:

17α-ethinyl-3-methoxy-17β-trimethylsilyloxy- $\Delta^{1,3,5(10)}$-estratriene

17α-ethinyl-3cyclopentyloxy-17β-trimethylsilyloxy- $\Delta^{1,3,5(10)}$-estratriene 17α-ethinyl-3,17β-bis-(trimethylsilyloxy)- $\Delta^{1,3,5(10)}$-estratriene 17α-ethinyl-3β,17β-bis-(trimethylsilyloxy)- $\Delta^5$-androstene 17α-chloroethinyl-3-methoxy-17β-trimethylsilyloxy- $\Delta^{1,3,5(10)}$-estratriene d,1-17α-ethinyl-3-methoxy-17β-trimethylsilyloxy-$\Delta^{1,3,5(10),8}$-estratetraene d,1-17α-ethinyl-3-methoxy-17β-trimethylsilyloxy- $\Delta^{1,3,5(10),9(11)}$-estratetraene 1-17α-ethinyl-3-methoxy-17β-trimethylsilyloxy-$\Delta^{1,3,5(10)}$-estratriene 17α-methyl-3β,17β-bis-(trimethylsilyloxy-$\Delta^4$-androstene 3α-ethinyl-3β,6α,17β-tri-(trimethylsilyloxy)-5β-androstane 17α-ethinyl-17β-trimethylsilyloxy-19-nor-$\Delta^4$-androstene-3-one 21-trimethylsilyloxy-$\Delta^4$-pregnene-3,20-dione 3-trimethylsilyloxy-$\Delta^{1,3,5(10)}$-estratriene-17β-valerianate 17β-trimethylsilyloxy-$\Delta^{1,3,5(10)}$-estratriene-3-benzoate 3,17β-bis-(trimethylsilyloxy)-$\Delta^{1,3,5(10)}$-estratriene d,1-17β-trimethylsilyloxy-19-nor-$\Delta^4$-androstene-3-one 3,16α-bis-(trimethylsilyloxy)-$\Delta^{1,3,5(10)}$-estratriene-17-one 3-methoxy-17β-trimethylsilyloxy-$\Delta^{1,3,5(10)}$-estratriene 3-trimethylsilyloxy-$\Delta^{1,3,5(10)}$-estratriene-17β-benzoate 17α-methyl-3β-trimethylsilyloxy-$\Delta^4$-androstene-17β-ol 3-trimethylsilyloxy-$\Delta^{1,3,5(10)}$-estratriene-17-one 17α-ethinyl-3-trimethylsilyloxy-$\Delta^{1,3,5(10)}$-estratriene-17β-ol 17α-ethinyl-17β-trimethylsilyloxy-$\Delta^{1,3,5(10)}$-estratroeme-3-ol 3-methoxy-17β-trimethylsilyloxy-$\Delta^{1,3,5(10)8,14}$-estrapenta-ene 3-methoxy-17β-trimethylsilyxy-$\Delta^{1,3,5(10)8(14)}$-estratetra-ene 3-methoxy-17β-trimethylsilyloxy-8,14-seco-estra-1,3,5(10),9(11)-tetraene-14-one 17β-trimethylsilyloxy-$\Delta^{1,3,5(10)}$-estratriene-3-ol The following Examples will illustrate the invention.

EXAMPLE 1

17α-ethinyl-3-methoxy-17β-trimethylsilyloxy-$\Delta^{1,3,5(10)}$-estratriene

Three g mestranol were dissolved upon heating in 30 ml dimethylformamide. The solution was then cooled and reacted upon stirring with 6 ml hexamethyldisilazane and 2 ml trimethylchlorosilane. The reaction mixture was allowed to stand for half an hour and the 17α-ethinyl-3-methoxy-17β-trimethyl-silyloxy-$\Delta^{1,3,5(10)}$-estratriene was then precipitated in crystalline form by adding 30 ml water. The crystalline product was removed by suction, washed with water and dried.

Yield: 3.58 g corresponding to 97 percent of the theoretical yield.

M.p.: 135°–138° C.

By recrystallization from hexane, the product was obtained as follows and as defined above M.p.: 136°–138° C [α]$_D$: −3.2° (c = 1, dioxane).

EXAMPLE 2

17 α-ethinyl-3-cyclopentyloxy-17β-trimethyl-silyloxy-$\Delta^{1,3,5(10)}$-estratriene.

Two g ethinylestradiol-3-cyclopentylether were dissolved in 15 ml dimethylformamide. The solution was reacted with 2.4 ml hexamethyldisilazane and 0.8 ml trimethylchlorosilane and allowed to stand for 15 minutes. The reaction product was precipitated in crystalline form by adding water and was then removed by suction and dried.

Yield: 2.36 g corresponding to 99 percent of the theoretical yield.

M.p.: 138–140° C.

After recrystallization from hexane, the product of m.p. between 138° and 141° C was obtained, as above defined

EXAMPLE 3

17α-ethinyl-3,17β-bis-trimethylsilyloxy-$\Delta^{1,3,5(10)}$-estratriene.

One g ethinylestradiol was dissolved in 10 ml dimethylformamide. The solution was reacted with 2 ml hexamethyldisilazane and 0.66 ml trimethylchlorosilane and allowed to stand for half an hour. Then water was added to the reaction and the 17 α-ethinyl-3,17β-bis-trimethylsilyloxy-$\Delta^{1,3,5(10)}$-estratriene was precipitated. The crystalline product was removed by suction, washed with water and dried.

Yield: 1.42 g, corresponding to 95 percent of the theoretical yield.

M.p.: 143–146° C.

EXAMPLE 4

17α-ethinyl-3-β,17β-bis-trimethylsilyloxy-$\Delta^5$-androstene.

0.5 g 17α-ethinyl- $\Delta^5$-androstene-3β,17β-diol was dissolved upon heating in 15 ml dimethylsulfoxide and subsequently reacted with 2 ml hexamethyldisilazane and 0.66 ml trimethylchlorosilane. The reaction mixture was allowed to stand for 2 hours, during which the desired reaction product crystallized out of the mixture. It was then removed by suction and the frit was washed with water and dried.

Yield: 700 mg, corresponding to 96 percent of the theoretical yield.

M.p.: 144–145° C.

EXAMPLE 5

17α-chloroethinyl-3-methoxy-17β-trimethyl-silyloxy-$\Delta^{1,3,5(10)}$-estratriene.

1.9 g 17α-chloroethinyl-3-methoxy-$\Delta^{1,3,5(10)}$-estratriene-17 β-ol were dissolved in dimethylformamide. The solution was reacted with 3 ml hexamethyldisilazane and 1 ml trimethylchlorosilane and allowed to stand for 30 minutes. The further treatment was the same as in Examples 1 to 3.

Yield: 2.2 g, corresponding to 96 percent of the theoretical yield.

M.p.: 111–112.5° C.

By recrystallization from hexane, a product was obtained having the following properties:

M.p.: 112°–114° C [α]$_D$: −17.4° (c = 1, dioxane).

EXAMPLE 6 dl-17α-ethinyl-3-methoxy-17β-trimethylsilyl-oxy-$\Delta^{1,3,5(10)8}$-estratetrene.

4.5 g dl-17α-ethinyl-3-methoxy-$\Delta^{1,3,5(10)8}$-estratetrene-17β-ol were dissolved in dimethylformamide and the solution was reacted with 4.5 ml hexamethyldisilazane and 1.5 ml trimethylchlorosilane. The reaction mixture was allowed to stand for half an hour and then further treated as described in Examples 1 to 3.

Yield: 5.4 g, corresponding to 97 percent of the theoretical yield.

M.p.: 88°–90° C.

By recrystallization from hexane, a product was obtained having a melting point between 91° and 92° C.

EXAMPLE 7 dl-17α-ethinyl-3-methoxy-17β-trimethylsilyl-oxy-$\Delta^{1,3,5(10),9(11)}$-estratetrene.

1.5 g dl-17α-ethinyl-3-methoxy-$\Delta^{1,3,5(10)9(11)}$-estratetrene-17 β-ol were dissolved in dimethylformamide. The solution was reacted with 1.5 ml hexamethyldisilazane and 0.5 ml trimethylchlorosilane and permitted to stand for half an hour. The further treatment was carried out as in Examples 1 to 3.

Yield: 1.81 g, corresponding to 98 percent of the theoretical yield.
M.p.: 119°–121° C.
By recrystallization from hexane, a product was obtained having a melting point between 121° and 122° C.

EXAMPLE 8

1-17α-ethinyl-3-methoxy-17β-trimethylsilyloxy-$\Delta^{1,3,5(10)}$-estratriene.

10 g 1-17α-ethinyl-3-methoxy-$\Delta^{1,3,5(10)}$-estratriene-17β-ol were dissolved in 100 ml dimethylformamide and the solution was reacted with 10 ml hexamethyldisilazane and 3.3 ml trimethyl-chlorosilane. The reaction mixture was permitted to stand for 1 hour and the reaction product was precipitated by adding water. The crystalline product was removed by suction, washed with water and dried.
Yield: 12.3 g, corresponding to 100 percent of the theoretical yield.
M.p.: 134°–136° C.
By recrystallization from hexane, a product was obtained having a melting point between 136° and 137° C.

EXAMPLE 9

17α-methyl-3β,17β-bis-trimethylsilyloxy-$\Delta^4$-androstene.

Two g 17α-methyl-$\Delta^4$-androstene-3β,17β-diol were dissolved in 20 ml dimethylformamide and the solution was reacted with 4 ml hexamethyldisilazane and 1 ml trimethylchlorosilane and permitted to stand. The further treatment was effected as in Examples 1–3.

By recrystallization from hexane, a product was obtained having a melting point between 85° and 86° C.

EXAMPLE 10

3α-ethinyl-3β,6α,17β-tri-(trimethylsilyloxy)-5β-androstane.

2.4 g 3α-ethinyl-5-β-androstane-3β,6α,17β-triol were dissolved in 25 ml dimethylformamide and the solution was reacted with 3.6 ml hexamethyldisilazane and 1.2 ml trimethylchlorosilane and permitted to stand for 1 hour. The further treatment was as in Examples 1–3.
Yield: 3.9 g, corresponding to 98.5 percent of the theoretical yield.
M.p.: 119°–120° C.
By recrystallization from hexane, a product was obtained having a melting point of 124°–125° C.

EXAMPLE 11

17α-ethinyl-17β-trimethylsilyloxy-19-nor-$\Delta^4$-androstene-3one.

One hundred mg 17α-ethinyl-19-nor-$\Delta^4$-androstene-17β-ol-3-one were dissolved in 3 ml dimethylformamide. The solution was then reacted with 0.5 ml hexamethyldisilazane and 0.15 ml trimethylchlorosilane and permitted to stand for 2 hours. The further treatment was as described in Examples 1–3.
Yield: 120 mg.
M.p.: 168°–170° C.
By recrystallization from hexane, a product was obtained as follows:
M.p.: 172°–174° C [α]$_D$: −28.3° (c = 1, dioxane).

EXAMPLE 12

21-trimethylsilyloxy-$\Delta^4$-pregnene-3,20-dione.

One g 21-hydroxy-$\Delta^4$-pregnene-3,20-dione was dissolved in dimethylformamide and the solution was reacted with 2 ml hexamethyldisilazane and then permitted to stand. Water was then added to the reaction mixture and the product thus precipitated. It was then washed with water and dried.
Yield: 1.14 g, corresponding to 94 percent of the theoretical yield.
M.P.: 121°–123.5° C.

EXAMPLE 13

3-trimethylsilyloxy-$\Delta^{1,3,5(10)}$-estratriene-17β-valerianate.

1.42 g $\Delta^{1,3,5(10)}$-estratriene-3-ol-17β-valerianate were dissolved in dimethylformamide and the solution reacted with 2.8 ml hexamethyldisilazane and then permitted to stand. The further treatment was as in Example 12.
Yield: 1.6 g, corresponding to 93.5 percent of the theoretical yield.
M.P.: 95°–96° C.
By recrystallization from hexane, a product was obtained having a melting point between 96° and 97° C.

EXAMPLE 14

17β-trimethylsilyloxy-$\Delta^{1,3,5(10)}$-estratriene-3-benzoate.

1.47 g $\Delta^{1,3,5(10)}$-estratriene-17β-ol-3-benzoate were dissolved in dimethylformamide and the solution was reacted with 2.9 ml hexamethyldisilazane and allowed to stand. The further treatment was as described in Example 12.
Yield: 1.74 g, corresponding to 99 percent of the theoretical yield.
M.p.: 123°–126° C.
By recrystallization from hexane, a product was obtained having a melting point between 123° and 128° C.

EXAMPLE 15

3,17β-bis-trimethylsilyloxy-$\Delta^{1,3,5(10)}$-estratriene.

0.9 g estradiol was dissolved in dimethylformamide and the solution was reacted with 2 ml hexamethyl-disilazane and then permitted to stand. The further treatment was as in Example 12.
Yield: 1.29 g, corresponding to 93 percent of the theoretical yield.
M.p.: 70°–72° C.
By recrystallization from hexane, a product was obtained having a melting point between 71° and 72° C.

EXAMPLE 16 dl-17β-trimethylsilyloxy-19-nor-$\Delta^4$-androstene-3-one.

0.5 g dl-19-nor-$\Delta^4$-androstene-3-one-17β-ol was dissolved in 5 ml dimethylsulfoxide and the solution was reacted with 1 ml hexamethyldisilazane and allowed to stand. The further treatment was as in Example 12.
Yield: 600 mg, corresponding to 94.5 percent of the theoretical yield.
M.p.: 97°–98.5° C.
By recrystallization from hexane, a product was obtained having a melting point between 99° and 100.5° C.

EXAMPLE 17

3,16α-bis-trimethylsilyloxy-$\Delta^{1,3,5(10)}$-estratriene-17-one.

Two hundred mg 16α-hydroxyestrone were dissolved in 2 ml dimethylformamide and the solution reacted with 0.4 ml hexamethyldisilazane and 0.15 ml trimethylchlorosilane and permitted to stand for 1 hour. The further treatment was as in Example 12.
Yield: 250 mg, corresponding to 99.5 percent of the theoretical yield.
By recrystallization from hexane, a product was obtained having a melting point of 143° to 146° C.

EXAMPLE 18

3-methoxy-17β-trimethylsilyloxy-$\Delta^{1,3,5(10)}$-estratriene.

Five g 3-methoxy-$\Delta^{1,3,5(10)}$-estratriene-17β-ol were dissolved in 50 ml dimethylformamide and the solution was reacted with 10 ml hexamethyldisililzane and allowed to stand. The further treatment was as in Example 12.
Yield: 5.9 g, corresponding to 94 percent of the theoretical yield.
M.p.: 85°–87° C.
By recrystallization from hexane, a product was obtained with a melting point between 87° and 89° C.

EXAMPLE 19

3-trimethylsilyloxy-$\Delta^{1,3,5(10)}$-estratriene-17β-benzoate.

1.5 g Δ$^{1,3,5(10)}$-estratriene-3-ol-17β-benzoate were dissolved in dimethylformamide. The solution was reacted with 3 ml hexamethyldisilazane and allowed to stand. The further treatment was as described in Example 12.

Yield: 1.63 g, corresponding to 91 percent of the theoretical yield.
M.p.: 138°–140° C.
By recrystallization from hexane, a product was obtained with a melting point between 140° and 142° C.

EXAMPLE 20

17α-methyl-3β-trimethylsilylhoxy-Δ$^4$-androstene-17β-ol.

Three g 17α-methyl-Δ$^4$-androstene-3β-diol were dissolved in dimethylformamide and the solution was reacted with 6 ml hexamethyldisilazane and allowed to stand. The further treatment was as in Example 12.

The product after recrystallization from hexane had a melting point of 128° to 130° C.

EXAMPLE 21

3-trimethylsilyloxy-Δ$^{1,3,5(10)}$-estratriene-17-one.

One hundred mg estrone were dissolved in dimethylformamide. The solution was reacted with 0.2 ml hexamethyldisilazane and allowed to stand. The further treatment was as described in Example 12.

Yield: 121 mg. corresponding to 95 percent of the theoretical yield.
M.p.: 161°–163° C.
By recrystallization from ether/hexane, a product was obtained as follows:
M.p.: 162°–164° C [α]$_D$: +131.7° (c = 1, dioxane).

EXAMPLE 22

17α-ethinyl-3-trimethylsilyloxy-Δ$^{1,3,5(10)}$-estratriene-17β-ol.

Five hundred mg ethinylestradiol were dissolved in dimethyl-formamide. The solution was then reacted with 1 ml hexamethyldisilazane and allowed to stand. The further treatment was as in Example 12.

Yield: 570 mg. corresponding to 92 percent of the theoretical yield.
M.p.: 64°–67° C.
Recrystallization from hexane resulted in a product as follows:
M.p.: 65°–68° C [α]$_D$: 2.3° (c = 1, dioxane).

EXAMPLE 23

17α-ethinyl-17β-trimethylsilyloxy-Δ$^{1,3,5(10)}$-estratriene-3-ol.

12.95 g 17α-ethinyl-3,17-bis-trimethylsilyloxy-Δ$^{1,3,5(10)}$-estratriene were dissolved upon heating in 600 ml methanol. The clear solution was allowed to stand for 3 hours. It was then concentrated in vacuum to a volume of between about 80 and 100 ml and the residue was reacted with water. The precipitated product was removed by suction, washed with water and dried.

Yield: 10.4 g, corresponding to 97 percent of the theoretical value.
M.p.: 159°–162° C.
Recrystallization from hexane resulted in a product as follows:
M.p.: 162°–163° C [α]$_D$: −5.1° (c = 1, dioxane).

EXAMPLE 24

17β-trimethylsilyloxy-Δ$^{1,3,5(10)}$-estratriene-3-ol

Five g 3,17-bis(trimethylsilyloxy)-Δ$^{1,3,5(10)}$-estratriene were dissolved, upon heating to between 30° and 40° C, in 200 ml methanol, and were then allowed to stand for 2 hours at room temperature. Subsequently the product was reacted with The product was then concentrated in a vacuum to about 30–40 ml. The distillation residue was added to 200 ml water upon stirring. The precipitated product was removed by suction, washed with water and dried. The yield was 4.0 g, corresponding to 97 percent of the theoretical yield. The melting point was 120°–124° C. Recrystallization from hexane furnished a product having a melting point between 127° and 128° C.

EXAMPLE 25

3-methoxy-17β-trimethylsilyloxy-Δ$^{1,3,5(10)8,14}$-estrapentaene

Five g 3-methoxy-Δ$^{1,3,5(10)8,14}$-estrapentaene-17β-ol were dissolved in 50 ml dimethylformamide and reacted with 5 ml hexamethyldisilazane and 1.6 ml trimethylchlorosilane. The reaction mixture was allowed to stand for half an hour and was then added to water upon stirring. The crude product was thereupon removed by suction, washed with water and dried. Subsequently, recrystallization was effected with hexane. The yield was 4.8 g, corresponding to 76.5 percent of the theoretical yield. The melting point was 67°–68° C.

EXAMPLE 26

3-methoxy-17β-trimethylsilyloxy-8,14-secoestra-1,3,5(10)9(11)-tetraene-14-one

Five g 3-methoxy-8,14-seco estra-1,3,5(10)9(11)-tetraene-14-one-17β-ol were dissolved in 50 ml dimethylformamide and reacted with 8 ml hexamethyldisilazane. The reaction mixture was allowed to stand for 24 hours at room temperature and was then stirred into water. The crude product was removed by suction, washed with water, dried and then recrystallized from hexane. The yield was 4.26 g, corresponding to 68.5 percent of the theoretical yield. Melting point: 78°–80aL C.

EXAMPLE 27

3-methoxy-17β-trimethylsilyloxy-Δ$^{1,3,5(10)8(14)}$-estratetraene

Three g 3-methoxy-Δ$^{1,3,5(10)8(14)}$-estratetraene-17β-ol were dissolved in 30 ml dimethylformamide. The solution was reacted with 3 ml hexamethyldisilazane and 1 ml trimethylchlorosilane and allowed to stand at room temperature for half an hour. The solution was then stirred into water and the crude product obtained was removed by suction, washed with water and dried. The recrystallization of the crude product yielded 1.14 g of the pure product, corresponding to 37.5 percent of the theoretical yield. The melting point was between 30° and 34° C for the first fraction obtained.

EXAMPLE 28

17α-ethinyl-3-methoxy-17β-trimethylsilyloxy-Δ$^{1,3,5(10)}$-estratriene 0.1 g mestranol were dissolved in 3 ml dimethylacetamide. The solution was reacted with 0l3 ml hexamethyldisilazane and 0.1 ml trimethylchlorosilane and allowed to stand at room temperature for 3 hours. Water was then added and the reaction product was removed by suction, washed with water and dried. The yield was 110 mg. The product had a melting point between 132° and 136° C.

What is claimed as new and desired to be protected by Letters Patent is set forth in the appended claims:

1. A trialkylsilyloxyether-substituted steroid selected from the group of compounds corresponding to the following formula:

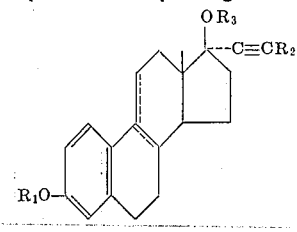

I wherein R$_1$ is hydrogen, methyl, cyclopentyl or trimethylsilyl, R$_2$ is hydrogen or chlorine and R$_3$ is hydrogen or trimethylsilyl with the proviso that at least one of R$_1$ and R$_3$ must be trimethylsilyl and wherein the bonds between carbon atoms 8 and 9 or 9 and 11 may also be unsaturated:

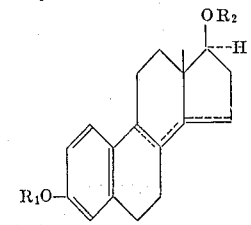

II wherein $R_1$ is hydrogen benzoate, trimethylsilyl or methyl, and $R_2$ is benzoate, valerianate or trimethylsilyl with the proviso that at least one of $R_1$ and $R_2$ must be trimethylsilyl and wherein the bonds between carbon atoms 8 and 14, 8 and 9, or 14 and 15 may also be unsaturated, and

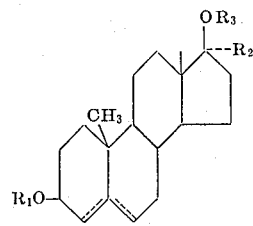

III wherein $R_1$ is trimethylsilyl, $R_2$ is methyl or ethinyl and $R_3$ is hydrogen or trimethylsilyl and wherein the bonds between carbon atoms 4 and 5 or 5 and 6 may also be unsaturated.

2. The compound of claim 1 which is 17α-ethinyl-3-methoxy-17β-trimethylsilyloxy-$\Delta^{1,3,5(10)}$-estratriene.

3. The compound of claim 1 which is 17α-ethinyl-3-cyclopentyloxy-17β-trimethylsilyloxy-$\Delta^{1,3,5(10)}$-estratriene.

4. The compound of claim 1 which is 17α-ethinyl-3,17β-bis-(trimethylsilyloxy)-$\Delta^{1,3,5(10)}$-estratriene.

5. The compound of claim 1 which is 17α-ethinyl-3β,17β-bis-(trimethylsilyloxy)-$\Delta^5$-androstene.

6. The compound of claim 1 which is 17α-chlorethinyl-3-methoxy-17β-trimethylsilyloxy-$\Delta^{1,3,5(10)}$-estratriene.

7. The compound of claim 1 which is d,1-17α-ethinyl-3-methoxy-17β-trimethylsilyloxy-$\Delta^{1,3,5(10),8}$-estratetraene.

8. The compound of claim 1 which is d,1-17α-ethinyl-3-methoxy-17β-trimethylsilyloxy-$\Delta^{1,3,5(10),9(11)}$-estratetraene.

9. The compound of claim 1 which is 1-17α-ethinyl-3-methoxy-17β-trimethylsilyloxy-$\Delta^{1,3,5(10)}$-estratriene.

10. The compound of claim 1 which is 17α-methyl-3β,17β-bis-(trimethylsilyloxy)-$\Delta^4$-androstene.

11. The compound of claim 1 which is 3α-ethinyl-3β,6α,17β-tri-(trimethylsilyloxy)-5β-androstane.

12. The compound of claim 1 which is 17α-ethinyl-17β-trimethylsilyloxy-19-nor-$\Delta^4$-androstene-3-one.

13. The compound of claim 1 which is 3-trimethylsilyloxy-$\Delta^{1,3,5(10)}$-estratriene-17β-valerianate.

14. The compound of claim 1 which is 17β-trimethylsilyloxy-$\Delta^{1,3,5(10)}$-estratriene-3-benzoate.

15. The compound of claim 1 which is 3-trimeth-ylsilyloxy-$\Delta^{1,3,5(10)}$-estratriene-17β-benzoate.

16. The compound of claim 1 which is 17α-methyl-3β-trimethylsilyloxy-$\Delta^4$-androstene-17β-ol.

17. The compound of claim 1 which is 17α-ethin-yl-3-trimethylsilyloxy-$\Delta^{1,3,5(10)}$-estratriene-17β-ol.

18. The compound of claim 1 which is 17α-ethin-yl-17β-trimethylsilyloxy-$\Delta^{1,3,5(10)}$-estratriene-3-ol.

19. The compound of claim 1 which is 3-methoxy-17β-trimethylsilyloxy-$\Delta^{1,3,5(10)8,14}$-estrapentaene.

20. The compound of claim 1 which is 3-methoxy-17β-trimethylsilyloxy-$\Delta^{1,3,5(10)8(14)}$-estratetraene.

21. The compound of claim 1 which is 17β-tri-methylsilyloxy-$\Delta^{1,3,5(10)}$-estratriene-3-ol.

* * * * *